United States Patent
Elsom et al.

(10) Patent No.: US 9,723,858 B2
(45) Date of Patent: Aug. 8, 2017

(54) FROZEN CONFECTION DISPENSING APPARATUS

(71) Applicant: H.C. Duke & Son, LLC, East Moline, IL (US)

(72) Inventors: Kyle Elsom, East Moline, IL (US); Jim Quandt, East Moline, IL (US); Dustin Meyermann, East Moline, IL (US); Mark Davis, East Moline, IL (US); Alexis Grabill, East Moline, IL (US)

(73) Assignee: H.C. Duke & Son, LLC, East Moline, IL (US)

( * ) Notice: Subject to any disclaimer, the term of this patent is extended or adjusted under 35 U.S.C. 154(b) by 0 days.

(21) Appl. No.: 14/705,358

(22) Filed: May 6, 2015

(65) Prior Publication Data

US 2016/0324185 A1     Nov. 10, 2016

(51) Int. Cl.
*A23G 9/28*          (2006.01)

(52) U.S. Cl.
CPC .................................. *A23G 9/282* (2013.01)

(58) Field of Classification Search
CPC ........ A23G 9/045; A23G 9/281; A23G 9/282; A47J 31/41; B01F 7/007; B01F 7/00708; B01F 7/00725
See application file for complete search history.

(56) References Cited

U.S. PATENT DOCUMENTS

| | | | |
|---|---|---|---|
| 2,925,102 A * | 2/1960 | Cummings | A23G 9/288 141/263 |
| 3,224,740 A | 12/1965 | Kuehn et al. | |
| 3,276,633 A * | 10/1966 | Rahauser | A23G 9/281 222/129.1 |
| 4,580,905 A * | 4/1986 | Schwitters | A23G 9/283 222/129.1 |
| 4,793,520 A | 12/1988 | Gerber | |
| 4,923,093 A * | 5/1990 | Gerber | A23G 9/282 222/129.1 |
| 5,159,818 A * | 11/1992 | Etou | A23G 9/045 222/138 |
| 6,223,949 B1 * | 5/2001 | Spencer | A23G 3/2015 137/605 |
| 6,318,889 B1 * | 11/2001 | Hansen, Sr. | A23G 9/12 366/286 |
| 6,689,410 B2 | 2/2004 | Gerber | |
| 7,178,976 B2 | 2/2007 | Gerber | |
| 7,533,684 B1 * | 5/2009 | Dalton, Jr. | F16K 11/10 137/240 |
| 7,621,669 B1 | 11/2009 | Gerber | |
| 7,665,398 B2 * | 2/2010 | Gerber | A23G 9/20 366/156.1 |

(Continued)

*Primary Examiner* — Frederick C Nicolas
*Assistant Examiner* — Bob Zadeh
(74) *Attorney, Agent, or Firm* — Dinsmore & Shohl LLP (57) ABSTRACT

A frozen confection dispensing apparatus includes a freezer section and a dispensing section connected to the freezer section. A mixing section is attached to the dispensing section. A user interface allows a user to select a desired flavor. A flavoring section includes a plurality of flavor syrups connected to at least one of injection port within the mixing section. A motor assembly turns a shaft and includes a mixing blade to regulate flow of frozen confection product within the mixing section as well as to blend or homogenize the frozen confection product and flavor syrup at the point of dispense.

21 Claims, 6 Drawing Sheets

(56) References Cited

U.S. PATENT DOCUMENTS

| | | | |
|---|---|---|---|
| 2006/0157152 A1* | 7/2006 | Wolski | B67D 1/0882 |
| | | | 141/275 |
| 2006/0251783 A1* | 11/2006 | D'Esposito | A23G 9/24 |
| | | | 426/438 |
| 2007/0110872 A1* | 5/2007 | Gerber | A23G 9/20 |
| | | | 426/565 |
| 2007/0295750 A1* | 12/2007 | Cocchi | A23G 9/045 |
| | | | 222/145.6 |
| 2008/0073376 A1* | 3/2008 | Gist | A23G 9/045 |
| | | | 222/145.5 |

* cited by examiner

FROZEN CONFECTION DISPENSING APPARATUS

FIELD OF THE INVENTION

The invention relates to a frozen confection dispensing apparatus and with more particularity to a frozen confection dispensing apparatus including multiple flavors mixed at the point of dispense.

BACKGROUND OF THE INVENTION

Generally, frozen confection dispensing apparatus are known in the art. Typically, such frozen confection dispensing apparatus requires that flavors are mixed with a frozen confection product while still in a liquid state to ensure complete blending. The mix is then delivered to a freeze cylinder and frozen prior to dispensing. To achieve multiple flavors, current dispensing apparatus would require an end user to have separate freeze cylinders and product mixes for each flavor to provide multiple product offerings. This would generally require the use of multiple machines in addition to product storage for various flavors.

There is therefore a need in the art for a frozen confection dispensing apparatus that enables an end user to supply multiple frozen confection flavors from a single machine. There is also a need in the art for a frozen confection dispensing apparatus that will work with a variety of frozen confection bases. There is also a need in the art for a frozen confection dispensing apparatus that provides a complete homogeneous mix of flavoring and frozen confection product to create a variety of base flavors at a point of dispense from a single frozen confection base ingredient.

SUMMARY OF THE INVENTION

In one aspect, there is disclosed a frozen confection dispensing apparatus that includes a freezer section having a frozen confection product. A dispensing section is connected to the freezer section. The dispensing section includes a dispensing conduit formed longitudinally therein and extends along a longitudinal dispensing axis from a dispensing inlet to a dispensing outlet. A plunger is movably positioned longitudinally within the dispensing conduit. A mixing section is attached to the dispensing section. The mixing section includes a mixing chamber formed longitudinally therein and extends along a longitudinal mixing axis from a mixing inlet to a point of dispense. The mixing section includes at least one injection port having multiple flavors or a plurality of injection ports formed circumferentially about the mixing chamber. The injection ports extend from an exterior of the mixing section to an interior surface of the mixing chamber. A user interface is provided allowing a user to select a desired flavor. A flavoring section includes a plurality of flavor syrups connected to pumps that selectively pump syrups to a specified injection port. A motor assembly including a motor is attached to a shaft. The shaft terminates at a terminal end in the mixing chamber. The terminal end includes a mixing blade attached thereon. The mixing blade includes an extrusion portion defining an annulus with the inner diameter of the mixing chamber providing a thin profile of frozen confection product fed to the mixing section and a blending portion that homogenizes the frozen confection product and flavor syrup at the point of dispense.

In another aspect, there is disclosed a frozen confection dispensing apparatus that includes a freezer section having a frozen confection product. A dispensing section is connected to the freezer section. The dispensing section includes a dispensing conduit formed longitudinally therein and extends along a longitudinal dispensing axis from a dispensing inlet to a dispensing outlet. A plunger is movably positioned longitudinally within the dispensing conduit. A mixing section is attached to the dispensing section. The mixing section includes a mixing chamber formed longitudinally therein and extends along a longitudinal mixing axis from a mixing inlet to a point of dispense. The mixing section includes at least one or a plurality of injection ports formed circumferentially about the mixing chamber. The injection ports extend from an exterior of the mixing section to an interior surface of the mixing chamber. A user interface is provided allowing a user to select a desired flavor. A flavoring section includes a plurality of flavor syrups connected to a specified injection port. A motor assembly including a motor is attached to a shaft. The shaft terminates at a terminal end in the mixing chamber. A mounting plate, the motor assembly and dispensing section are attached to the mounting plate and the mounting plate is fixedly attached to the freezer section. The terminal end includes a mixing blade attached thereon. The mixing blade includes an extrusion portion defining an annulus with the inner diameter of the mixing chamber providing a thin profile of frozen confection product fed to the mixing section and a blending portion that homogenizes the frozen confection product and flavor syrup at the point of dispense.

In a further aspect, there is disclosed a frozen confection dispensing apparatus that includes a freezer section having a frozen confection product. A dispensing section is connected to the freezer section. The dispensing section includes a dispensing conduit formed longitudinally therein and extends along a longitudinal dispensing axis from a dispensing inlet to a dispensing outlet. A plunger is movably positioned longitudinally within the dispensing conduit. A mixing section is attached to the dispensing section. The mixing section includes a mixing chamber formed longitudinally therein and extends along a longitudinal mixing axis from a mixing inlet to a point of dispense. The mixing section includes at least one or a plurality of injection ports formed circumferentially about the mixing chamber. The injection ports extend from an exterior of the mixing section to an interior surface of the mixing chamber. A user interface is provided allowing a user to select a desired flavor. A flavoring section includes a plurality of flavor syrups connected to a specified injection port. A motor assembly including a motor is attached to a shaft. The shaft terminates at a terminal end in the mixing chamber. The terminal end includes a mixing blade attached thereon. The mixing blade includes an extrusion portion defining an annulus with the inner diameter of the mixing chamber providing a thin profile of frozen confection product fed to the mixing section and a blending portion that homogenizes the frozen confection product and flavor syrup at the point of dispense. The mixing blade includes an extrusion portion defining an annulus with the inner diameter of the mixing chamber providing a thin profile of frozen confection product fed to the mixing section and a blending portion homogenizing the frozen confection product and flavor syrup wherein the annulus has a dimension of from 2 to 20% relative to the inner diameter of the mixing chamber.

In yet another aspect there is disclosed a process for dispensing a frozen confection product comprising the steps of: providing a dispensing apparatus; selecting a desired flavored frozen confection; dispensing a base frozen confection to a mixing section of the dispensing apparatus;

forming a thin annular profile of the base frozen confection; injecting a selected flavoring agent into the thin annular profile; blending the selected flavoring agent and base frozen confection forming a uniform flavored frozen confection at a point of dispense; and dispensing the uniform flavored frozen confection.

DETAILED DESCRIPTION OF THE PREFERRED EMBODIMENTS

Referring to the various figures, there is shown an embodiment of a frozen confection dispensing apparatus 20 that includes a freezer section 22 that freezes a frozen confection product. Frozen confection products may include soft serve, sorbet, custard, yogurt, frozen carbonated products, frozen un-carbonated products, Italian ice and other frozen products. A dispensing section 24 is connected to the freezer section 22. A mixing section 26 is attached to the dispensing section 24. A user interface 25 allows a user to select a desired flavor. A flavoring section 28 includes a plurality of flavor syrups connected to an injector such as pumps 30 or pressurized mechanisms that selectively pump or move syrups to a specified injection port 32 within the mixing section 26. A motor assembly 34 turns a shaft 36 that passes through the dispensing section 24 and mixing section 26 and includes a mixing blade 38 to regulate flow of frozen confection product within the mixing section 26 as well as to blend or homogenize the frozen confection product and flavor syrup at the point of dispense. In one aspect the shaft may pass outside of the dispensing section 24 and mixing section 26 with an appropriate coupling or transmission.

The frozen confection dispensing apparatus 20 blends flavoring syrups and a frozen confection base mix in the mixing chamber 26 uniformly and does so in a mixing chamber 26 that minimizes product waste when switching between flavors. In one aspect, the mixing chamber 26 includes a volume corresponding to less than 1.25 ounces of frozen confection product. Additionally, the blending of the frozen confection product and flavor syrup is achieved so as not to degrade the base product.

Referring to FIGS. 1-4, there is shown an embodiment of a frozen confection dispensing apparatus 20 that includes a freezer section 22 having a frozen confection product fed thereto and freezes the liquid base mix. A dispensing section 24 is connected to the freezer section 22. The dispensing section 24 includes a dispensing conduit 40 formed longitudinally therein and extends along a longitudinal dispensing axis 42 from a dispensing inlet 44 to a dispensing outlet 46. A plunger 48 is movably positioned longitudinally within the dispensing conduit 40. The plunger 48 may be coupled to a handle 50 that may be actuated by an end user to move the plunger 48 within the dispensing conduit 48 allowing frozen confection product to enter the dispensing conduit 48.

A mixing section 26 is attached to the dispensing section 24. In one aspect, the mixing section 26 is attached coaxially relative to the dispensing section 24. The mixing section 26 includes a mixing chamber 52 formed longitudinally therein and extends along a longitudinal mixing axis 54 from a mixing inlet 56 to a point of dispense 58. The mixing section 26 includes at least one and in one aspect, a plurality of injection ports 60 formed circumferentially about the mixing chamber 52. The injection ports 60 extend from an exterior 62 of the mixing section 26 to an interior surface 64 of the mixing chamber 52. In one aspect at least one injection port may include multiple flavoring valves. A user interface 25 is provided on the apparatus allowing a user to select a desired flavor. A flavoring section 28 including a plurality of flavor syrups is connected to an injection mechanism such as a pressurized mechanism or pumps 30 that selectively move syrups to a specified injection port 32.

A motor assembly 34 includes a motor attached to a shaft 36. The shaft 36 passes through the plunger 48, dispensing conduit 40 and terminates at a terminal end 66 in the mixing chamber 26. In one aspect, the shaft 36 is sealed relative to the plunger 48 preventing leakage of a frozen confection product. The terminal end 66 of the shaft 36 includes a mixing blade 38 attached thereon. In one aspect, the mixing blade 38 includes an extrusion portion 68 that defines an annulus with the inner diameter 70 of the mixing chamber 52 providing a thin profile of frozen confection product fed to the mixing section 26 that regulates the flow of the base product. Alternatively, the thin profile may be formed by contacting the base frozen confection with a gap defined by two concentric structures to define the annulus. For example, a fixed hollow tubular structure may be positioned within the mixing chamber to define an annular flow of the base material. In the depicted embodiment, the extrusion portion 68 and the inner diameter 70 define the annulus. A blending portion 72 of the mixing blade 38 homogenizes the frozen confection product and flavor syrup at the point of dispense.

Figures 1, 2:
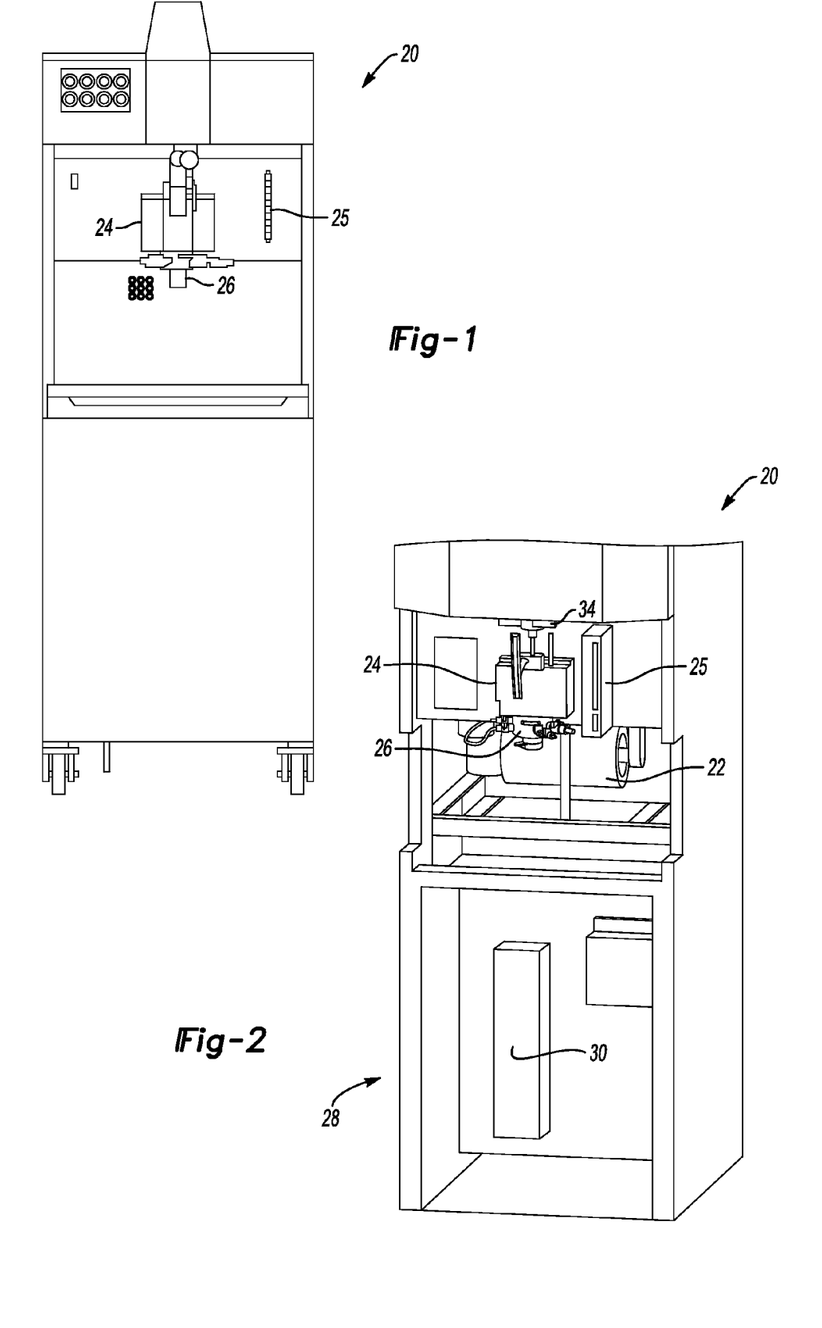
FIG. 1 is a front view of a frozen confection dispensing apparatus.
FIG. 2 is a partial perspective view of a frozen confection dispensing apparatus.
Figure 3:
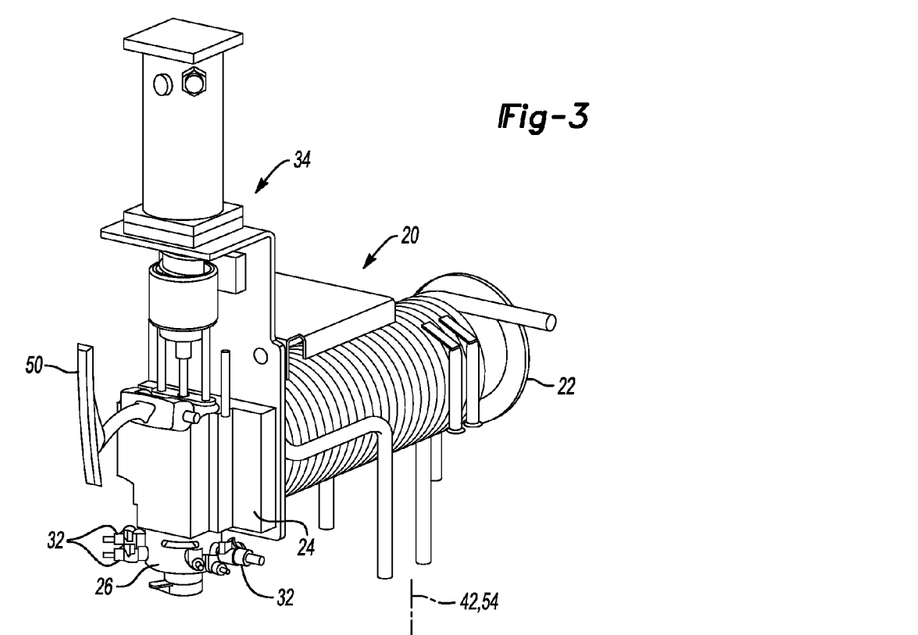
FIG. 3 is a partial perspective view of a motor assembly attached to a freezer section.
Figure 4A:
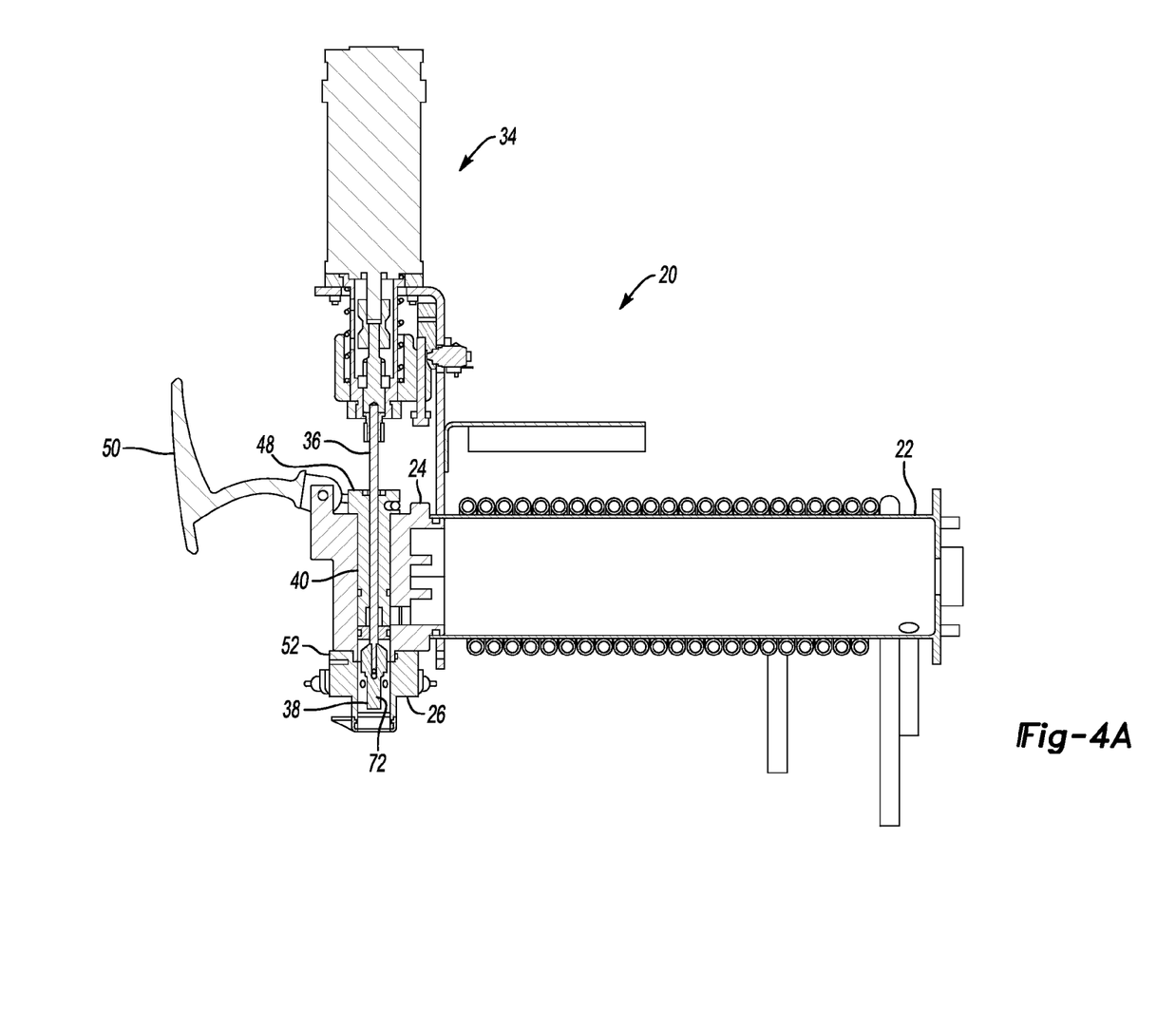
FIG. 4A is a cross-sectional view of the motor assembly and freezer apparatus of FIG. 3.
Figure 4B:
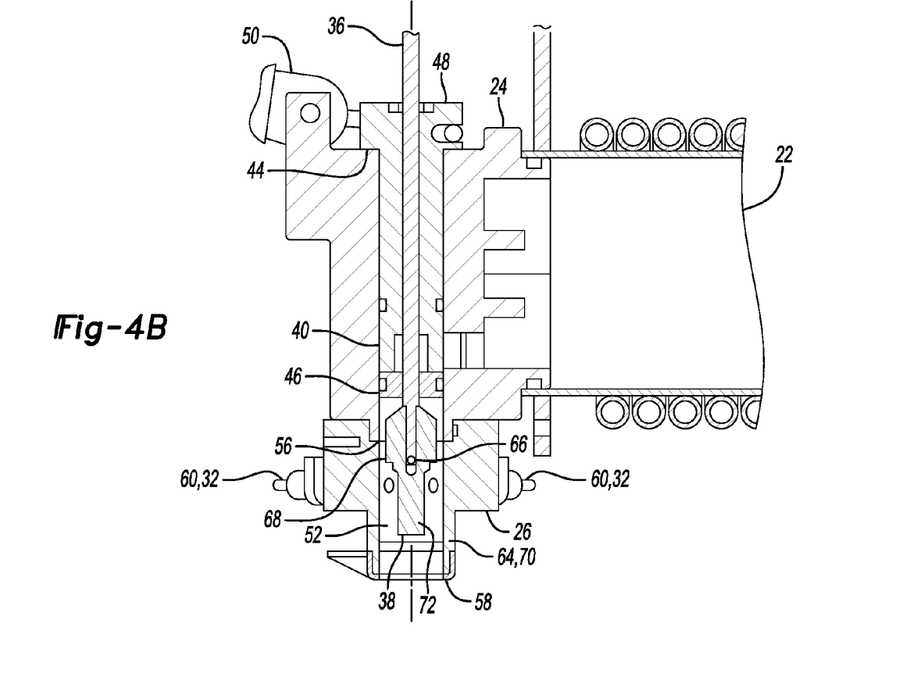
FIG. 4B is a partial cross-sectional view of a frozen confection dispensing apparatus.
Figure 5:
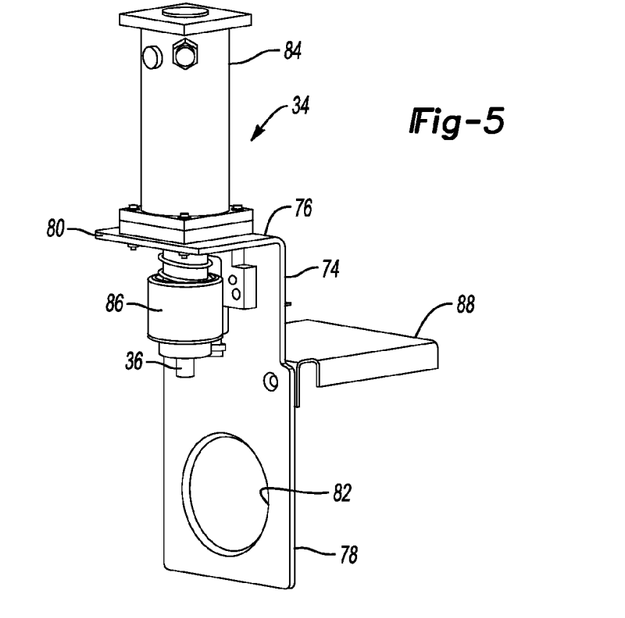
FIG. 5 is a partial perspective view of the motor assembly and mounting plate.

Referring to FIGS. 3, 4, and 5, there are shown views of the motor assembly 34 and mounting plate 74. In one aspect, the motor assembly 34 and dispensing section 24 are attached to the mounting plate 74. The mounting plate 74 includes a generally L-shaped body 76 having first and second legs 78, 80. In one aspect the first leg 78 includes a through bore 82 that is positioned about the freezer section 22. The second leg 80 provides a surface for mounting the motor assembly 34 including an electric motor 84 and transmission 86. The first leg 78 includes an attachment brace 88 connected thereon. The attachment brace 88 may be fastened or coupled to the freezer section 22 such that the motor 84, shaft 36, and mixing section 26 are aligned. In one aspect, the mounting plate 74 may be welded to or otherwise attached to the freezer section 22. This structural arrangement reduces tolerance stack and provides an accurate and repeatable method to align the shaft 36 to the mixing section 26.

Figure 6:
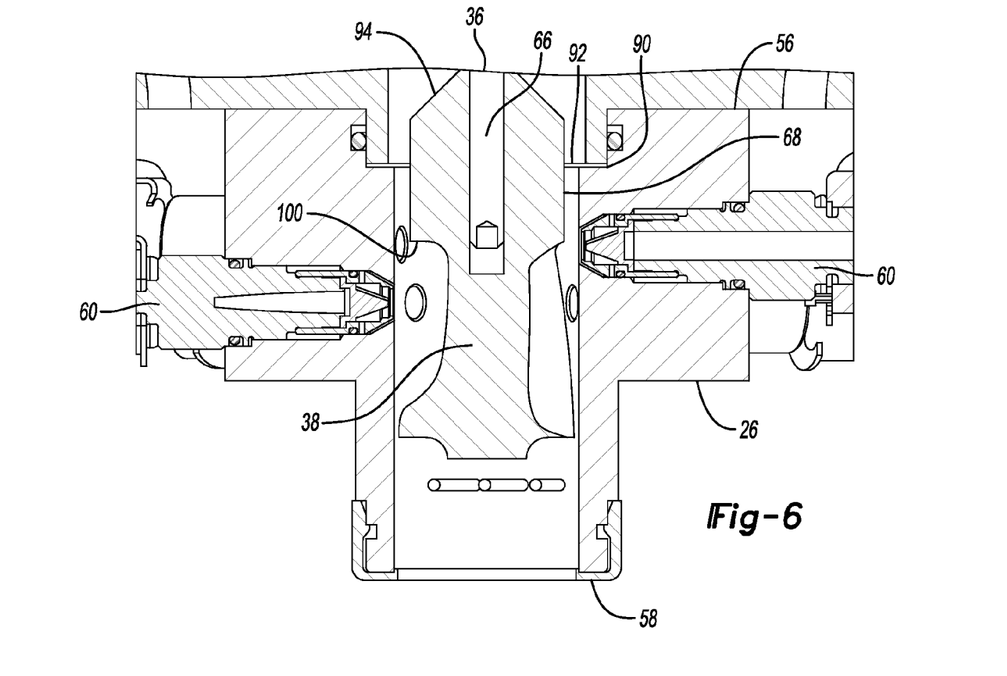
FIG. 6 is a partial sectional view of the dispensing section and mixing section including the mixing blade and injection ports.
Figure 7:
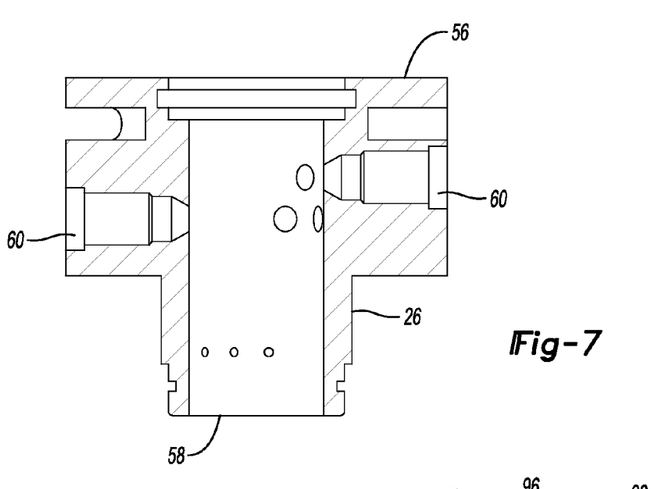
FIG. 7 is a partial sectional view of the mixing chamber including the injection ports.

Referring to FIGS. 6 and 7, the mixing section 26 includes a counter bore 90 formed on the dispensing inlet 56 that receives an extension 92 formed on the dispensing section 24. The mixing section 26 may be attached to the dispensing section 24 utilizing various techniques including fasteners or threaded couplings. In one aspect, the mixing section 26 is sealed relative to the dispensing section utilizing O-rings or other such sealing devices.

Figure 8:
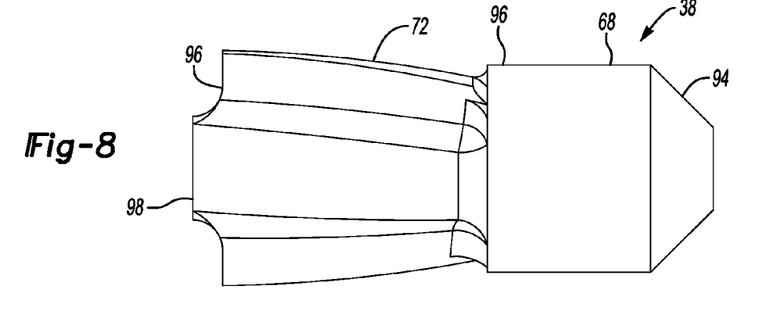
FIG. 8 is a side view of the mixing blade.

Referring to FIGS. 6, 7, and 8, the mixing blade extrusion portion 68 includes a chamfered surface 94 that extends longitudinally to a cylindrical portion 96. The inner surface of the mixing chamber 26 and outer surface of the cylindrical portion 96 define the annulus. In one aspect, the annulus has a dimension of from 2 to 20% relative to the inner diameter of the mixing chamber 26. For example, the outer diameter of the extrusion portion may be 0.880 inches and the inner diameter of the mixing chamber 26 may be 1.063 inches.

The blending portion 72 of the mixing blade extends longitudinally from the cylindrical portion 96. The blending portion 72 includes a helical blade 98 formed thereon. In one aspect, the blending portion 72 has a length of around ⅔ relative to an overall length of the mixing blade 38. For example, the bending portion 72 may have a length of 1.250 inches and the blade may have an overall length of 2.085 inches.

Additionally, the extrusion portion 68 includes a length of around ⅓ relative to an overall length of the mixing blade 38. For example, the extrusion portion 68 may have a length of 0.692 inches and the blade may have an overall length of 2.085 inches.

In this manner, the mixing section 26 includes a relatively small volume eliminating waste, as described above. Additionally, the annulus provides a thin profile of frozen confection product fed to the mixing section 26 ensuring a homogeneous mixing of the frozen confection base and flavor syrups. The low profile thin section helps to reduce mechanical energy impacts on the base mix and ensures an optimal blending of the frozen confection base product and flavor syrup. The blending portion 72 of the mixing blade applies a turbulence utilizing a high speed motor. The low profile, low volume, and high speed mixing provides a complete homogeneous mixing of the frozen confection base product while minimizing residual waste within the mixing chamber 26. Additionally, the relatively small volume of the mixing section 26 provides clearance to cups or other items positioned below the point of dispense to accommodate various sizes and configurations.

Again referring to FIGS. 6 and 7, the plurality of injection ports 60 may be positioned longitudinally spaced from each other about the circumference of the mixing section 26. As shown in the figures, the injection ports 60 may be positioned longitudinally along the mixing axis 54 from the mixing inlet 56 a distance of from 20 to 65% relative to an overall length of the mixing chamber 26. For example, a distance to the top most positioned port may be 0.780 inches from the mixing inlet with an overall length of the mixing chamber of 2.234 inches. A distance to the lower most positioned port may be 1.11 inches from the mixing inlet with an overall length of the mixing chamber of 2.234 inches.

Additionally, the injection ports 60 may be positioned longitudinally along the mixing axis 54 from a terminal edge 100 of the extrusion portion 68 a distance of from 0 to 25% relative to an overall longitudinal length of the mixing chamber 26. For example, a distance to the top most positioned port may be 0.0263 inches from the terminal edge with an overall length of the mixing chamber of 2.234 inches. A distance to the lower most positioned port may be 0.353 inches from the terminal edge with an overall length of the mixing chamber of 2.234 inches.

The described configurations provide a uniform and complete mixing of the frozen confection product and flavor syrup in a low volume mixing chamber 26.

Figure 9:
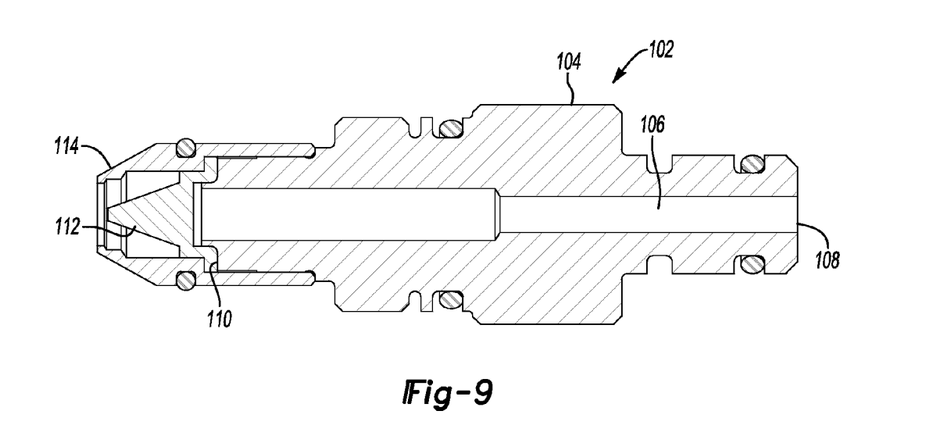
FIG. 9 is a cross-sectional view of the syrup connection structures.
Figures 10, 11:
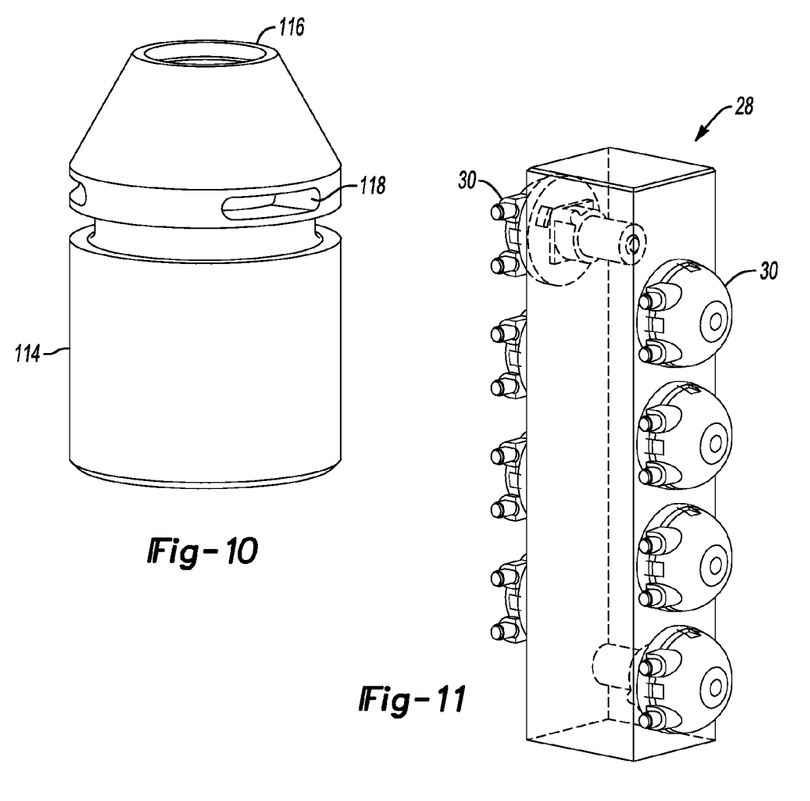
FIG. 10 is a perspective view of a valve cap.
FIG. 11 is a partial perspective view of a pump assembly for the plurality of injection ports and flavoring syrups.

Referring to FIGS. 6 and 9, the injection ports 60 may include syrup connection structures 102 disposed therein. In one aspect, the syrup connection structures 102 include a cylindrical body 104 having a bore 106 formed longitudinally there through and extend from an input end 108 to an output end 110. The output end 110 includes a valve structure 112 regulating a flow of syrup. In one aspect, the output end 110 of the syrup connection structure includes a valve cap 114 attached thereon. The valve cap 114, as best shown in FIG. 10, includes an orifice 116 formed thereon. The orifice 116 regulates and diverts flow of the frozen confection product preventing backflow into the valve structure 112. Additionally, the valve cap 114 includes slots 118 formed there through about a circumferential surface of the valve cap 114 allowing cleaning of the valve cap in a rinse operation.

Figure 12:
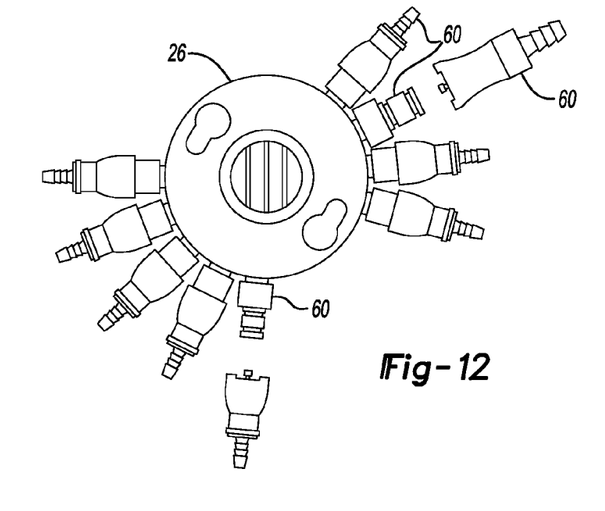
FIG. 12 is a partial top view of a frozen confection dispensing apparatus showing the plurality of injection ports.

In use, a user may select a desired flavor for a frozen confection product. The user may then actuate the handle 50 moving the plunger 48 within the dispensing conduit 48 allowing the frozen base product to enter from the freezer section 22 into the dispensing section 24. The electric motor drives the shaft 36 within the mixing section 26. Injection devices or pumps 30, as best shown in FIG. 11, move a liquid flavoring agent within lines connected to various of the plurality of injection ports 60, best shown in FIG. 12. The liquid flavoring syrup is provided to the mixing chamber 26 through the valve 112 in a specified amount and rate that may be adjusted by an end user. The frozen confection base product passes through the dispensing conduit 48 and contacts the extrusion portion 68 of the mixing blade 38 to provide an annulus or thin profile of frozen confection product that is fed to the mixing section 26. In one aspect the thin profile may be formed by contacting the base frozen confection with a gap defined by two concentric structures. In the depicted embodiment, the extrusion portion 68 and the inner diameter 70 define the annulus and thin profile. The counter-rotating mixing blade 38 relative to the pitch of the blending portion 72 rotates the mixing blade 38 such that the helical blade 98 homogenizes the frozen confection product and flavor syrup to form a uniform product that is blended at the point of dispense. After a desired amount of blended product is dispensed, a user may command a rinse process wherein water may be provided to the mixing chamber 26 through one of the injection ports 60 such that any remaining frozen confection product is removed from the mixing chamber. Alternatively, pressurized air or a mechanical purge device may be utilized for the rinse. As specified above, the residual blended product may be less than 1.25 ounces. The slots 118 formed in the valve cap 114 of the injection ports 60 allow rinsing of the injection ports 60 such that any flavoring syrup remnants are removed from the mixing chamber 26.

In one aspect, the flavor syrups may be provided and stored in a refrigerated section such that the temperature differential between the syrup and base product mix is minimized ensuring a uniform product.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A frozen confection dispensing apparatus comprising:
a freezer section including a frozen confection product;
a dispensing section connected to the freezer section, the dispensing section including a dispensing conduit formed longitudinally therein and extending along a longitudinal dispensing axis from a dispensing inlet to a dispensing outlet, and a plunger movably positioned longitudinally within the dispensing conduit;
a mixing section attached to the dispensing section, the mixing section including a mixing chamber formed longitudinally therein and extending along a longitudinal mixing axis from a mixing inlet to a point of dispense, the mixing section including at least one injection port, the at least one injection port extending from an exterior of the mixing section to an interior surface of the mixing chamber;
a user interface allowing a user to select a desired flavor;
a flavoring section including a plurality of flavor syrups connected to the at least one injection port;
a motor assembly including a motor attached to a shaft, the shaft terminating at a terminal end in the mixing chamber, the terminal end including a mixing blade attached thereon;
wherein the mixing blade includes an extrusion portion defining an annulus with the inner diameter of the mixing chamber providing a thin profile of frozen confection product fed to the mixing section and a blending portion homogenizing the frozen confection product and flavor syrup at the point of dispense wherein the annulus has a dimension of from 2 to 20% relative to the inner diameter of the mixing chamber.

2. The frozen confection dispensing apparatus of claim 1 wherein the at least one injection port includes a plurality of injection ports formed circumferentially about the mixing chamber.

3. The frozen confection dispensing apparatus of claim 2 including pumps that selectively pump the plurality of syrups to the plurality of injection ports.

4. The frozen confection dispensing apparatus of claim 2 wherein the plurality of injection ports are positioned longitudinally spaced from each other about the circumference of the mixing section.

5. The frozen confection dispensing apparatus of claim 2 wherein the plurality of injection ports are positioned longitudinally along the mixing axis from the mixing inlet a distance of from 20 to 65% relative to an overall longitudinal length of the mixing chamber.

6. The frozen confection dispensing apparatus of claim 2 wherein the plurality of injection ports are positioned longitudinally along the mixing axis from a terminal edge of the extrusion portion a distance of from 0 to 25% relative to an overall longitudinal length of the mixing chamber.

7. The frozen confection dispensing apparatus of claim 1 wherein the shaft passes through the plunger, dispensing conduit and terminating at the terminal end in the mixing chamber.

8. The frozen confection dispensing apparatus of claim 1 including a mounting plate, the motor assembly and dispensing section attached to the mounting plate and the mounting plate fixedly attached to the freezer section.

9. The frozen confection dispensing apparatus of claim 1 wherein the mixing section includes a counter bore formed on the dispensing inlet and receiving an extension formed on the dispensing section.

10. The frozen confection dispensing apparatus of claim 1 wherein the mixing blade extrusion portion includes a chamfered surface extending longitudinally to a cylindrical portion, the inner surface of the mixing chamber and an outer surface of the cylindrical portion defining the annulus.

11. The frozen confection dispensing apparatus of claim 10 wherein the blending portion extends longitudinally from the cylindrical portion, the blending portion including a helical blade formed thereon.

12. The frozen confection dispensing apparatus of claim 1 wherein the blending portion has a length that is ⅔ relative to an overall length of the mixing blade.

13. The frozen confection dispensing apparatus of claim 1 wherein the extrusion portion includes a length that is ⅓ relative to an overall length of the mixing blade.

14. The frozen confection dispensing apparatus of claim 1 wherein the at least one injection port includes syrup connection structures disposed therein.

15. The frozen confection dispensing apparatus of claim 14 wherein the syrup connection structures include a cylindrical body having a bore formed longitudinally there through and extending from an input end to an output end, the output end including a valve structure regulating a flow of syrup.

16. The frozen confection dispensing apparatus of claim 15 wherein the output end of the syrup connection structure includes a valve cap attached thereon, the valve cap including an orifice formed therein, the orifice regulating and diverting flow of the frozen confection product preventing back flow into the valve structure.

17. The frozen confection dispensing apparatus of claim 16 wherein the valve cap includes slots formed there through about a circumferential surface allowing cleaning of the valve cap.

18. The frozen confection dispensing apparatus of claim 1 wherein the mixing chamber includes a net volume of less than 1.25 ounces.

19. A frozen confection dispensing apparatus comprising:
a freezer section including a frozen confection product;
a dispensing section connected to the freezer section, the dispensing section including a dispensing conduit formed longitudinally therein and extending along a longitudinal dispensing axis from a dispensing inlet to a dispensing outlet, and a plunger movably positioned longitudinally the dispensing conduit;
a mixing section attached to the dispensing section, the mixing section including a mixing chamber formed longitudinally therein and extending along a longitudinal mixing axis from a mixing inlet to a point of dispense, the mixing section including at least one injection port, the at least one injection port extending from an exterior of the mixing section to an interior surface of the mixing chamber;
a user interface allowing a user to select a desired flavor;
a flavoring section including a plurality of flavor syrups connected to the at least one injection port;

a motor assembly including a motor attached to a shaft, the shaft terminating at a terminal end in the mixing chamber, the terminal end including a mixing blade attached thereon;

a mounting plate, the motor assembly and dispensing section attached to the mounting plate and the mounting plate fixedly attached to the freezer section;

wherein the mixing blade includes an extrusion portion defining an annulus with the inner diameter of the mixing chamber providing a thin profile of frozen confection product fed to the mixing section and a blending portion homogenizing the frozen confection product and flavor syrup at the point of dispense wherein the annulus has a dimension of from 2 to 20% relative to the inner diameter of the mixing chamber.

20. A frozen confection dispensing apparatus comprising:

a freezer section including a frozen confection product;

a dispensing section connected to the freezer section, the dispensing section including a dispensing conduit formed longitudinally therein and extending along a longitudinal dispensing axis from a dispensing inlet to a dispensing outlet, and a plunger movably positioned longitudinally within the dispensing conduit;

a mixing section attached to the dispensing section, the mixing section including a mixing chamber formed longitudinally therein and extending along a longitudinal mixing axis from a mixing inlet to a point of dispense, the mixing section including at least one injection port, the at least one injection port extending from an exterior of the mixing section to an interior surface of the mixing chamber;

a user interface allowing a user to select a desired flavor;

a flavoring section including a plurality of flavor syrups connected to the at least one injection port;

a motor assembly including a motor attached to a shaft, the shaft terminating at a terminal end in the mixing chamber, the terminal end including a mixing blade attached thereon;

wherein the mixing blade includes an extrusion portion defining an annulus with the inner diameter of the mixing chamber providing a thin profile of frozen confection product fed to the mixing section and a blending portion homogenizing the frozen confection product and flavor syrup wherein the annulus has a dimension of from 2 to 20% relative to the inner diameter of the mixing chamber.

21. The frozen confection dispensing apparatus of claim 20 wherein the mixing chamber includes a volume of less than 1.25 ounces.

* * * * *